US012719688B1

(12) United States Patent
Fernando et al.

(10) Patent No.: US 12,719,688 B1
(45) Date of Patent: Aug. 25, 2026

(54) SYSTEMS AND METHODS FOR WRAPPED CRYPTOGRAPHIC PROOFS OF ELECTRONIC COMMUNICATIONS

(71) Applicant: APTOS FOUNDATION, George Town (KY)

(72) Inventors: Rex David Fernando, New York, NY (US); Ioan Alin Tomescu, Austin, TX (US)

(73) Assignee: APTOS FOUNDATION, George Town (KY)

( * ) Notice: Subject to any disclaimer, the term of this patent is extended or adjusted under 35 U.S.C. 154(b) by 0 days.

(21) Appl. No.: 19/337,658

(22) Filed: Sep. 23, 2025

(51) Int. Cl.
*H04L 9/32* (2006.01)
*H04L 9/08* (2006.01)

(52) U.S. Cl.
CPC .......... *H04L 9/3221* (2013.01); *H04L 9/0825* (2013.01); *H04L 9/3247* (2013.01)

(58) Field of Classification Search
CPC .... H04L 9/3221; H04L 9/0825; H04L 9/3247
See application file for complete search history.

(56) References Cited

U.S. PATENT DOCUMENTS 10,581,615 B2 3/2020 Xie et al.
10,805,072 B2 10/2020 Corduan et al.
10,904,000 B2 1/2021 Gray
10,922,421 B2 2/2021 Liu et al.
10,938,574 B2 3/2021 Drake et al.
10,972,274 B2 4/2021 Redpath et al.
11,233,641 B2 1/2022 Soundarajan et al.
11,323,269 B2 5/2022 Cao et al.
11,336,464 B2 5/2022 Roscoe et al.
11,343,099 B2 5/2022 Herder, III et al.
11,496,310 B2 11/2022 Brown et al.
11,700,133 B2 7/2023 Hong et al.
11,818,271 B2 11/2023 Chmora et al.
11,973,750 B2 4/2024 Simic et al.
12,126,715 B2 10/2024 Smith et al.
12,432,066 B2 9/2025 Harrison et al.
12,445,288 B2 10/2025 Khiyaoui et al.
12,481,969 B2 11/2025 Gouget et al.
(Continued)

FOREIGN PATENT DOCUMENTS

WO 2025159740 A1 7/2025

*Primary Examiner* — Henry Tsang

(57) ABSTRACT

Disclosed are systems and methods for generating and utilizing wrapped cryptographic proofs in electronic communications and distributed ledger environments. A client device creates a first cryptographic proof comprising a public input and a first relation, configured to provide proof of a first secret statement based on transaction parameters. Upon verification, a second secret statement is generated, and a second cryptographic proof is obtained from an independent proving service, utilizing the same public input and a second relation to prove the second secret statement. The transaction, public input, and second cryptographic proof are submitted to a distributed ledger, enabling verifiers to confirm the authenticity of the first secret statement without exposing sensitive data. The approach supports enhanced privacy, security, and interoperability, and may incorporate zero-knowledge proofs, leaky proving protocols, or combinations thereof, facilitating scalable and efficient validation of transactions and user identities.

20 Claims, 4 Drawing Sheets

(56) References Cited

U.S. PATENT DOCUMENTS

2020/0374113 A1 11/2020 Noam et al.
2021/0385219 A1 12/2021 Khi et al.
2022/0239500 A1 7/2022 Wahab et al.
2023/0318837 A1 10/2023 Oh
2023/0336366 A1 10/2023 Davies et al.
2024/0127235 A1 4/2024 Lindermann
2024/0129126 A1* 4/2024 Baeza-Yates ......... H04L 9/3221
2025/0030666 A1* 1/2025 Chalkias ............. H04L 63/0428
2025/0119293 A1* 4/2025 Jayachandran ........... H04L 9/50
2025/0267019 A1 8/2025 Larraia
2026/0074903 A1 3/2026 Krasnyansky

* cited by examiner

SYSTEMS AND METHODS FOR WRAPPED CRYPTOGRAPHIC PROOFS OF ELECTRONIC COMMUNICATIONS

FIELD OF TECHNOLOGY

The present disclosure generally relates to computer-based systems and methods for wrapped cryptographic proofs of data associated with electronic communications, including wrapped proofs for proving user authenticity, transaction authenticity or both of distributed ledger-based transactions using zero knowledge proofs, non-zero knowledge proofs, or both.

BACKGROUND OF TECHNOLOGY

Zero-knowledge proofs (ZKPs) are cryptographic protocols that enable one party, referred to as the "prover," to demonstrate the validity of a statement to another party, known as the "verifier," without revealing any underlying information about the statement itself. This is achieved through mathematical constructs that ensure the verifier can be confident in the truth of the claim while maintaining the privacy of the data being proven. ZKPs are particularly useful in scenarios where sensitive information, such as personal identifiers or financial data, needs to remain confidential while still allowing for verification of authenticity or compliance.

SUMMARY

In some aspects, the techniques described herein relate to a method including: receiving, by at least one processor executing on a client device, via an application on the client device, a first cryptographic proof comprising a public input and a first relation configured to prove a first secret statement based at least in part on one or more transaction parameters; verifying, by the at least one processor, the first secret statement; generating, by the at least one processor and based at least in part on successful verification of the first secret statement, a second secret statement; obtaining, by the at least one processor from an external proving service, a second cryptographic proof comprising the same public input and a second relation configured to prove the second secret statement; and submitting, by the at least one processor to a distributed ledger, a transaction including the transaction parameters, the public input, and the second cryptographic proof; wherein the second cryptographic proof enables a ledger verifier to confirm the first secret statement based at least in part on the public input. Moreover, the method may further include: receiving, by the at least one processor, from an account service, a cryptographic signature over a user identifier, an application identifier, and a nonce populated with a public key; generating, by the at least one processor, the first secret statement based at least in part on the user identifier or the application identifier; incorporating, by the at least one processor, the second cryptographic proof into a transaction signature; employing, by the at least one processor, one or more zero-knowledge proofs (for example, zkSNARKs) or a leaky proving protocol that does not satisfy a formal definition of zero knowledge; obtaining, by the at least one processor, additional cryptographic proofs for one or more additional secret statements; and utilizing, by the at least one processor, different proving protocols—such as a transparent zero-knowledge protocol for the first proof—while partitioning the one or more transaction parameters between the first and second secret statements.

In some aspects, the techniques described herein relate to a system including: at least one processor in communication with at least one non-transitory computer-readable medium having software instructions stored thereon, wherein the software instructions, upon execution by the at least one processor, cause the system to perform the method operations described above. Accordingly, the system is configured to receive and verify the first cryptographic proof, generate the second secret statement, obtain the second cryptographic proof, and submit the transaction, the public input, and the second cryptographic proof to the distributed ledger, wherein the ledger verifier is enabled to confirm the first secret statement based at least in part on the public input.

In some aspects, the techniques described herein relate to a non-transitory computer-readable medium storing instructions that, when executed by a processing system, cause the processing system to perform the above method operations. The non-transitory computer-readable medium facilitates creation and verification of first and second cryptographic proofs, integration of keyless account service signatures, and submission of proofs to a distributed ledger for validation of an underlying secret statement.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
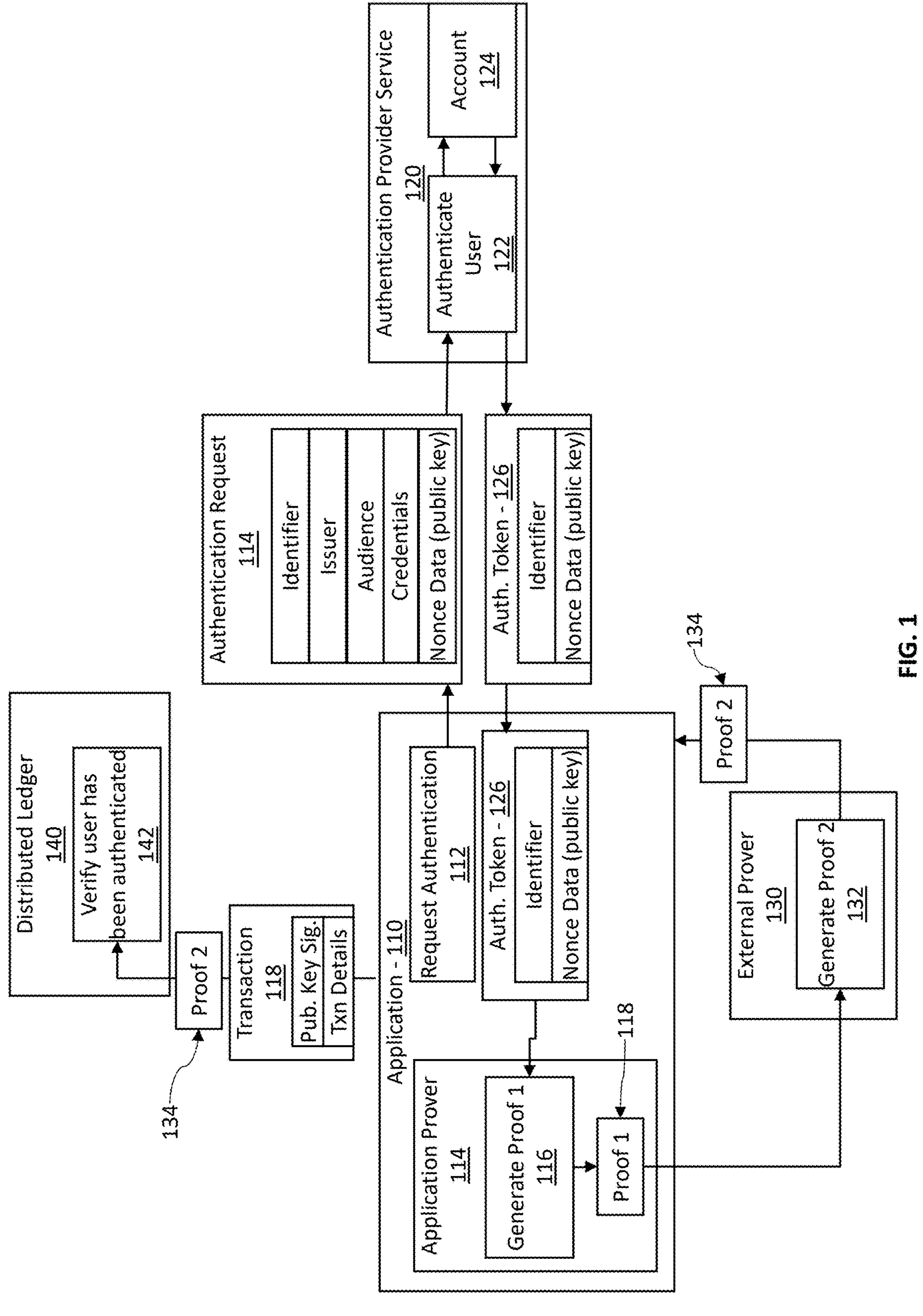
FIG. 1 depicts a block diagram of an authentication process involving cryptographic proofs and distributed ledger verification in accordance with one or more embodiments of the present disclosure.

Various detailed embodiments of the present disclosure, taken in conjunction with the accompanying FIGs., are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

The present disclosure relates generally to systems and methods for generating and utilizing cryptographic proofs, particularly wrapped cryptographic proofs, in the context of electronic communications and distributed ledger technologies. These cryptographic proofs may include zero-knowledge proofs (ZKPs), non-zero-knowledge proofs, or combinations thereof, enabling enhanced privacy, security, and authenticity in verifying user identities, transaction parameters, and other sensitive data. The disclosed systems and methods address technical challenges in efficiently creating, validating, and submitting cryptographic proofs while maintaining compatibility with distributed ledger infrastructures.

The domain of cryptographic proofs, particularly ZKPs, has become increasingly significant in promoting privacy and security in electronic communications and distributed ledger technologies. ZKPs enable a prover to demonstrate the validity of a statement (e.g., a relation) to a verifier without disclosing the underlying data, the secret statement w, making them suitable for applications involving sensitive information such as personal identifiers or transaction details. However, current implementations of ZKPs encounter several challenges. These include computational inefficiencies, obstacles in scalability, and difficulties in integrating with distributed ledger infrastructures. Moreover, while ZKPs offer strong privacy guarantees, they often rely on complex proving protocols that can be resource-intensive and may not align with the practical requirements of certain applications. Additionally, non-zero-knowledge proofs, which provide alternative cryptographic mechanisms, have not been sufficiently utilized to address these challenges, resulting in gaps in the ability to balance privacy, efficiency, and compatibility.

The present disclosure addresses these limitations by introducing systems and methods for generating and utilizing wrapped cryptographic proofs, including both zero-knowledge and non-zero-knowledge proofs, in the context of electronic communications and distributed ledger technologies. The described approach improves upon prior methods by enabling the creation of layered or "wrapped" proofs, where an inner proof provides verification of a first relation to prove a first secret statement w, and an outer proof verifies a second relation to prove a second secret statement w derived from the inner proof. Additional proofs can "wrap" the second proof to create additional layers of proofs, enabling the original secret data to be wrapped in additional layers of proofs, divided across different layers of the proofs, or other techniques for dividing the proving of the underlying confidential data across provers and/or proving stages. For example, additional layers or wraps of proofs can be formed as follows: proof 1 (client), proof 2 (service 1), proof 3 (client), proof 4 (service 2) and so on, such that the client may compute proof 1, send it to service 1, get proof 2 from this service, send it to another service 2, get proof 3 from this service, etc. which may include the client computing a Spartan proof 1, receiving a sparse Multilinear Extensions (MLE) opening as proof 2, wrapping the Spartan verification in Groth16 as proof 3, and so on. As such, each proof can be more-than-zero knowledge, or, put another way, not strictly a zero knowledge proof as some risk of information leakage can be tolerated in each layer. This architecture enhances privacy and security while reducing computational overhead. By incorporating non-zero-knowledge proving protocols alongside zero-knowledge protocols, the described system achieves a flexible balance between privacy preservation and efficiency, making the approach suitable for a wide range of applications.

The solution utilizes specialized algorithms and system architecture improvements to enhance the proof generation and validation processes. For instance, the described approach introduces a mechanism for account authentication without relying on traditional private keys, where cryptographic signatures are generated to improve security and usability. Furthermore, the described system supports the use of transparent zero-knowledge proofs and leaky proving protocols, which, while not strictly zero-knowledge, offer adequate privacy assurances for specific applications. These advancements are designed to integrate smoothly with distributed ledger infrastructures, promoting compatibility and scalability. By addressing the technical challenges present in existing cryptographic proof systems, the described framework offers a reliable method for verifying user authenticity, transaction parameters, and other sensitive data in a secure and efficient manner.

Techniques described herein introduces a layered cryptographic proof structure, where a first cryptographic proof is generated to verify a first secret statement, and a second cryptographic proof is generated to verify a second secret statement derived from the first proof. In some embodiments, both the first and the second cryptographic proof argue the same statement, such as by the first cryptographic proof arguing the validity of the secret statement directly, with the second cryptographic proof arguing that there exists a proof (the first cryptographic proof) that argues the validity of the statement. In some embodiments, each of two or more proofs may argue for the validity of the statement, a portion of the statement or any combination thereof, and do so directly, indirectly, or any combination thereof. In some embodiments, This layered approach enhances the security and privacy of the verification process by ensuring that sensitive transaction parameters are not directly exposed, while still allowing for their authenticity to be validated.

By utilizing a proving service separate from the application, the method decentralizes the proof generation process, reducing the computational burden on the client device and enabling scalability for systems with high transaction volumes. This separation also allows for modular integration with distributed ledger infrastructures, ensuring compatibility across different blockchain platforms.

The submission of the second cryptographic proof to the distributed ledger ensures that the verification process is immutable and transparent. The distributed ledger acts as a trusted repository, enabling verifiers to independently validate the authenticity of the first secret statement without requiring access to the underlying sensitive data. This arrangement supports the integrity of the transaction while maintaining privacy.

The use of public input in both cryptographic proofs facilitates interoperability and standardization, as the public input can be shared across different systems and applications without compromising security. This design choice simplifies the integration of the method into existing cryptographic and blockchain frameworks.

The layered proof structure provides a mechanism for hierarchical validation, where the second proof builds upon the first proof. This approach reduces redundancy in the verification process and optimizes computational resources, as the second proof leverages the results of the first proof rather than duplicating the verification effort.

Based on such technical features, further technical benefits become available to users and operators of these systems and methods. Moreover, various practical applications of the disclosed technology are also described, which provide further practical benefits to users and operators that are also new and useful improvements in the art.

FIG. 1 is block diagram 100 for an authentication process involving cryptographic proofs and distributed ledger verification in accordance with one or more embodiments of the present disclosure. In some embodiments, the block diagram 100 illustrates the interaction between an application prover 114, an external prover 130, an authentication provider service 120, and a distributed ledger 140 to ensure secure and verifiable transactions.

In some embodiments, at step 112, an application prover 114 may initiate the process by requesting authentication 112 from an authentication provider service 120. The authentication request 112 may include an identifier, nonce data (e.g., a public cryptographic element), and other credentials necessary for authentication. Accordingly, at step 122, the authentication provider service 120 may authenticate a user 122 and associate the user with an account 124. Upon successful authentication, at step 126, the authentication provider service 120 may generate and return an authentication token 126 to the application prover 114, the authentication token 126 serving as proof of the user's identity and authorization.

In some embodiments, the authentication provider service 120 is a trusted entity or system responsible for verifying the identity of a user and issuing authentication credentials that can be used by applications or services to confirm the user's identity. This service may be implemented as an identity provider (IdP) in a federated authentication system, such as an OpenID Connect provider, a SAML identity provider, or a proprietary authentication backend. The authentication provider service 120 typically manages user accounts, processes authentication requests, and enforces security policies such as multi-factor authentication or password requirements.

In some embodiments, upon successful authentication of a user, the authentication provider service 120 generates and returns an authentication token 126 to the requesting application or client, e.g., the application 110. The authentication token 126 serves as cryptographic proof of the user's identity and authorization status. Examples of authentication tokens 126 include JSON Web Tokens (JWTs) issued by OpenID Connect providers, SAML assertions, OAuth2 access tokens, or proprietary signed tokens. These tokens may contain information such as the user's identifier, the issuing authority, expiration time, and cryptographic signatures to prevent tampering.

For instance, in an OpenID Connect scenario, the authentication provider service 120 may authenticate a user via username and password (and optionally a second factor), and then issue a JWT as the authentication token 126. This token can then be presented by the application to other services or verifiers as proof that the user has been authenticated by a trusted authority, without exposing the user's password or other sensitive credentials.

Thereafter, in some embodiments, at step 116, the application prover 114 may use the authentication token 126 to generate a first cryptographic proof ("Proof 1") 118 via a generate proof 1 module 116. Proof 1 118 may verify a first secret statement, such as the user's identity or transaction parameters, based on the public input provided during the authentication process. Proof 1 118 may then serve as the basis for further validation without exposing the underlying sensitive data.

In some embodiments, the first secret statement for Proof 1 118 can be a secret assertion or claim that the prover seeks to demonstrate as true without revealing the underlying sensitive data. For example, the statement for Proof 1 118 may be that the prover possesses a valid authentication token associated with a specific user identity, or that certain transaction parameters meet predefined criteria. In the context of electronic communications and distributed ledger transactions, the statement for Proof 1 118 could include claims such as the user's identity has been authenticated, the user is authorized to perform a transaction, or the transaction details satisfy required business rules.

Cryptographic proving protocols utilized for generating Proof 1 118 can be designed to ensure the secure and private verification of a first secret statement, such as user identity or transaction parameters, without exposing the underlying sensitive data. These protocols may include zero-knowledge proofs (ZKPs), such as zkSNARKs (Zero-Knowledge Succinct Non-Interactive Arguments of Knowledge), which allow the prover to demonstrate the validity of the secret statement to a verifier using a compact proof that requires minimal computational resources for verification. Alternatively, non-zero-knowledge proving protocols may be employed, which provide enhanced efficiency and flexibility by relaxing strict privacy requirements while still maintaining sufficient confidentiality for specific applications. In some embodiments, transparent zero-knowledge proofs or leaky proving protocols may be used, which, although not strictly zero-knowledge, offer adequate privacy assurances and are optimized for scenarios requiring interoperability with distributed ledger infrastructures.

Examples of proofs that are not strictly zero knowledge include transparent zero-knowledge proofs and leaky proving protocols. Transparent zero-knowledge proofs, such as those based on the STARK (Scalable Transparent Argument of Knowledge) framework, do not require a trusted setup and may leak limited information about the structure of the underlying statement, though they still provide strong privacy guarantees in practice. Leaky proving protocols are another example, where the protocol fails to satisfy a formal definition of zero knowledge but is engineered to reveal only a controlled or negligible amount of information about the secret statement. These types of proofs are often used in scenarios where strict zero-knowledge is not required, but efficiency, scalability, or interoperability with distributed ledger infrastructures is prioritized.

In some embodiments, to enhance security and verifiability, at step 130, the application prover 114 may submit Proof 1 118 to an external prover 130. At step 132, the external prover 130 may generate a second cryptographic proof ("Proof 2") 134 via a generate proof 2 module 132. Proof 2 134 may validate Proof 1 118 in order to derive a second secret statement regarding the validity of the Proof 1 118. Thereby implementing a layered approach that preserves authenticity while maintaining privacy of transaction parameters.

In some embodiments, an external prover 130 can be a computing entity or service that operates independently from the application prover and is responsible for generating a second cryptographic proof (Proof 2 134) based on the output of the first cryptographic proof (Proof 1 118). The external prover may be implemented as a remote server, a cloud-based service, or a dedicated hardware module, and is typically managed by a party distinct from the client device or application that generated Proof 1 118. By delegating the generation of Proof 2 134 to an external prover, the system decentralizes the proof generation process, thereby reducing the computational burden on the client device and enabling greater scalability for high transaction volumes. The external prover receives Proof 1 118 and associated public input, verifies Proof 1 118, and then constructs Proof 2 134, which attests to the validity of a second secret statement derived from Proof 1 118. This layered approach enhances security and privacy by ensuring that sensitive data is not directly exposed to the distributed ledger or other verifiers, while still allowing for robust validation of the underlying transaction or authentication parameters.

In some embodiments, verification of Proof 1 118 can be performed using a verification algorithm to check the validity of the proof without learning any underlying secret information w. For instance, in the case of a zkSNARK (Zero-Knowledge Succinct Non-Interactive Argument of Knowledge), the verifier is provided with a succinct proof and a set of public inputs. The verifier then runs the zkSNARK verification algorithm, which efficiently determines whether the proof attests to the correctness of a secret information w (such as knowledge of a private key or the validity of a transaction) via a relation without revealing the secret information w itself. If the verification algorithm outputs a positive result, the verifier is assured that the prover possesses the required knowledge or that the transaction is valid, all while maintaining the privacy of the sensitive data. In some embodiments, the application prover 114 can be the prover of Proof 1 118 (e.g., the entity that creates the proof), and the external prover 130 can be the verifier of Proof 1 118 as well as the prover of Proof 2 134. In some embodiments, the external prover 130 may be the prover for both Proof 1 118 and Proof 2 134, or the application prover 114 may the prover for both Proof 1 118 and Proof 2 134, or any combination of one or more entities can be prover of Proof 1 118, Proof 2 134, etc.

In some embodiments, the secret information w for Proof 2 134 is a second assertion that is derived from, and attests to the validity of, the first cryptographic proof (Proof 1 118). Specifically, Proof 2 134 is constructed to prove that Proof 1 118 is valid with respect to the relation associated with Proof 1 118, without revealing the underlying secret information w from Proof 1 118. For example, the secret information w for Proof 2 134 may assert that a valid Proof 1 118 exists for a particular public input, or that the user associated with Proof 1 118 has been authenticated according to the required criteria. In some embodiments, the secret information w for Proof 2 134 may also include additional conditions or parameters that are derived from the verification of Proof 1 118, such as compliance with business rules or authorization policies. By generating Proof 2 134 based on this secret information w and a relation associated with Proof 2 134, the system enables a layered or wrapped proof structure that enhances privacy and security, allowing verifiers to confirm the authenticity of the original secret statement without direct access to the sensitive data.

In some embodiments, two proofs are depicted, however additional layers or wraps of proofs may be used, where each successive proof is constructed to prove the validity of the immediately preceding proof.

Accordingly, in some embodiments, at step 140, the transaction 118, including Proof 2 134, a public signature and transaction details, may be submitted to a distributed ledger 140. In step 142, the distributed ledger 140 may verify that the user has been authenticated by validating Proof 2 134 and the associated transaction details. Because the distributed ledger 140 provides immutable recording, the verification process ensures both integrity and transparency of the transaction while preserving confidentiality of the underlying data.

In some embodiments, the transaction 118 can be a digitally signed data structure that records the transfer of assets, execution of smart contracts, or other operations between parties on a distributed ledger network such as a blockchain network. Each transaction typically includes details such as the sender and recipient addresses, the amount or asset being transferred, transaction-specific parameters, and one or more cryptographic proofs or signatures that verify the authenticity and authorization of the transaction.

The submission of the transaction 118 to a distributed ledger 140 involves transmitting the transaction data, along with any required cryptographic proofs (such as Proof 2 134), to the blockchain network for validation and recording. Once submitted, the distributed ledger 140, comprising a decentralized network of nodes, verifies the transaction by checking the validity of the cryptographic proofs, ensuring compliance with consensus rules, and confirming that the transaction does not conflict with existing ledger entries (such as double-spending). Upon successful validation, the transaction is immutably recorded in a new block on the distributed ledger 140, making the transaction visible and auditable to all participants in the network.

In some embodiments, the verification 142 of the transaction 118 can be a process performed by the distributed nodes that constitute the network. When a transaction is submitted, each node independently validates the transaction to ensure compliance with the network's consensus rules and security requirements before the transaction is incorporated into a new block on the distributed ledger.

In some embodiments, the verification process can include the following steps:

1. Signature Verification: The node checks the cryptographic signatures attached to the transaction to confirm that the sender is authorized to initiate the transaction. This involves verifying that the signature corresponds to the sender's public cryptographic identifier and that the transaction has not been tampered with.
2. Proof Validation: If the transaction includes cryptographic proofs, such as zero-knowledge proofs (e.g., Proof 2 134), the node runs the appropriate verification algorithm to ensure the proof is valid for the claimed relation without revealing any underlying secret information w.

3. Input Validation: The node verifies that the transaction inputs (such as referenced unspent outputs or account balances) are valid, unspent, and sufficient to cover the transaction amount and any associated fees. This prevents double-spending and ensures the integrity of the ledger.
4. Consensus Rule Compliance: The node verifies that the transaction adheres to all network-specific rules, including format requirements, fee structures, and smart contract logic. For instance, in smart contract platforms, the node may simulate the execution of the contract to confirm that the process will not fail or breach protocol constraints.
5. Conflict Detection: The node ensures that the transaction does not conflict with other pending or confirmed transactions, such as attempting to spend the same asset twice.

If the transaction passes all verification steps, the transaction is considered valid and is propagated to other nodes in the network. Over time, the transaction is included in a new block, which is added to the blockchain through the consensus mechanism (such as proof-of-work or proof-of-stake). Once recorded, the transaction becomes an unchangeable part of the distributed ledger, offering transparency, auditability, and trust for all participants in the blockchain network.

In some embodiments, the described system may leverage a decentralized proving service to reduce computational overhead on a client device and enable scalability for high transaction volumes. By separating proof generation into an inner proof created by the application prover 114 and an outer proof created by the external prover 130, the system may achieve a flexible balance between privacy preservation and efficiency. Furthermore, in some embodiments, the use of public input in both Proof 1 118 and Proof 2 134 may facilitate interoperability and standardization across different systems and applications, simplifying integration with existing cryptographic and blockchain frameworks.

Figure 2:
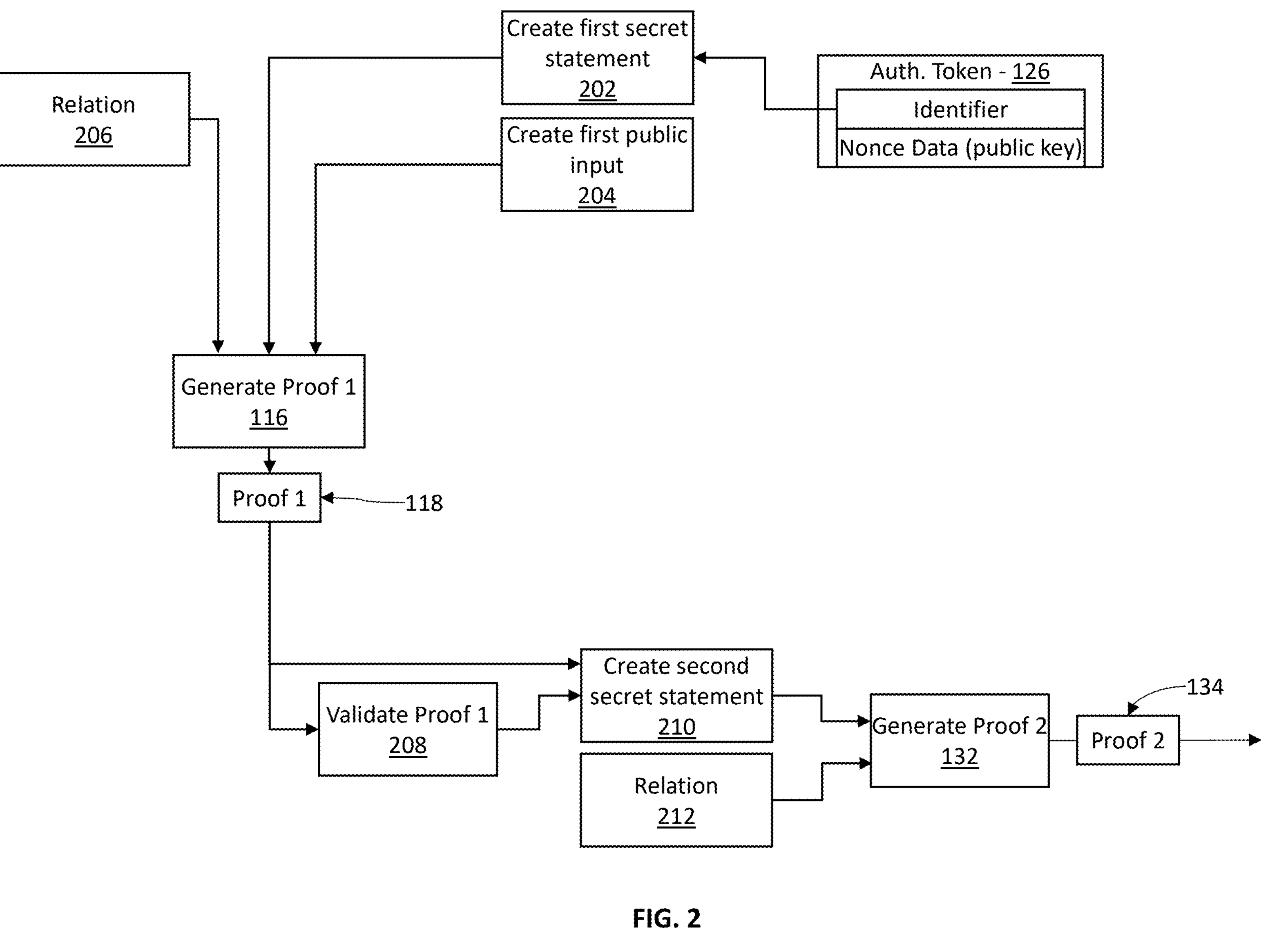
FIG. 2 depicts a flowchart of the proof generation process for creating and validating cryptographic proofs in accordance with one or more embodiments of the present disclosure.

FIG. 2 is flowchart 200 for a method of generating and validating layered cryptographic proofs in accordance with one or more embodiments of the present disclosure. In some embodiments, at least one processor of a computing device may perform the following steps, where the steps respectively correlate with 201-214 of FIG. 2. Accordingly, this process involves the generation of an initial proof that is validated, followed by the generation of a secondary proof that builds upon the initial proof. The flowchart illustrates the sequential steps and interactions between components involved in the proof generation process.

In some embodiments, in step 201, the proof generation module 116 may create a first secret statement 202, which represents a confidential assertion that the prover seeks to validate without revealing the underlying sensitive data. In some embodiments, the first secret statement 202 is derived from inputs such as an authentication token 126, an identifier, and nonce data (e.g., a public encryption parameter) provided by an authentication provider service during the initial authentication phase. As a result, the first secret statement 202 is securely associated with the user's identity or transaction parameters.

In some embodiments, in step 202, the system may simultaneously generate a first public input 204, which serves as a publicly accessible element that facilitates the verification of the first secret statement 202. The first public input 204 is generated based on the authentication token 126 and other associated data, thereby ensuring that the first public input 204 can be shared across systems without compromising the confidentiality of the first secret statement 202. The relation 206 defines the mathematical or logical relationship between the first secret statement 202 and the first public input 204, enabling the generation of a cryptographic proof.

In some embodiments, in step 203, using the first secret statement 202, the first public input 204, and the relation 206, the generate proof 1 module 116 may generate a first cryptographic proof ("Proof 1") 118. Proof 1 118 provides evidence of the validity of the first secret statement 202 based on the first public input 204 without exposing the sensitive data underlying the first secret statement 202. As a result, this proof is compact and computationally efficient, making it suitable for verification by external entities.

In some embodiments, examples of proofs for Proof 1 118 include Zero-knowledge proofs (ZKPs). Proof 1 118 may be implemented as a zero-knowledge proof, such as a zkSNARK (Zero-Knowledge Succinct Non-Interactive Argument of Knowledge), which allows the prover to demonstrate knowledge of a secret (e.g., possession of a valid authentication token or satisfaction of certain transaction parameters) without revealing the underlying sensitive data. For example, Proof 1 118 could prove that the user possesses a valid authentication token 126 associated with a specific identity, or that certain transaction parameters meet predefined business rules, without disclosing the actual token or parameters.

In some embodiments, examples of proofs for Proof 1 118 include transparent zero-knowledge proofs. In some embodiments, Proof 1 118 may utilize transparent zero-knowledge proofs, such as those based on the STARK (Scalable Transparent Argument of Knowledge) framework. These proofs do not require a trusted setup and may leak limited information about the structure of the underlying statement, but still provide strong privacy guarantees in practice.

In some embodiments, examples of proofs for Proof 1 118 include Flexible Identity Proof (FKI) proofs. Proof 1 118 be an FKI proof which is a type of cryptographic proof that demonstrates possession or knowledge of a secret associated with a flexible, user-specific cryptographic identifier, without revealing the identifier or the underlying sensitive data itself. In the context of Proof 1 118, an FKI proof can be used to prove that a user possesses a valid authentication credential or has satisfied certain identity or transaction requirements, while maintaining privacy and flexibility in managing cryptographic identifiers. For example, an FKI proof may be constructed as a zero-knowledge proof or a signature-based proof where the secret statement is tied to a user-specific identifier (such as one generated for a particular session, device, or application). The proof allows a verifier to confirm that the prover holds the correct identifier and meets the required conditions, but does not expose the identifier or any confidential information. This approach is particularly useful in scenarios where users may have multiple credentials for different services or devices, or where credential rotation and adaptable credential management are important for security and usability. The FKI proof enables secure authentication and authorization without relying on static, long-term credentials, and supports interoperability across various identity providers and distributed ledger systems.

In some embodiments, examples of proofs for Proof 1 118 include leaky proving protocols. Proof 1 118 may also be generated using leaky proving protocols, which are not strictly zero-knowledge but are engineered to reveal only a controlled or negligible amount of information about the secret statement. These protocols are suitable for scenarios where strict zero-knowledge is not required, but efficiency and interoperability with distributed ledger infrastructures are prioritized.

In some embodiments, examples of proofs for Proof 1 118 include non-zero-knowledge proofs. In some cases, Proof 1 118 may be constructed using non-zero-knowledge cryptographic proofs, which provide evidence of the validity of a secret statement (such as user authentication or transaction compliance) but may reveal some limited information about the underlying data. These proofs can offer enhanced efficiency and flexibility for specific applications.

In some embodiments, examples of proofs for Proof 1 118 include signature-based proofs. Proof 1 118 may also be implemented as a cryptographic signature over a set of public inputs, such as a digital signature generated using a private cryptographic identifier associated with an authentication provider or an account service that does not rely on cryptographic identifiers. The signature can serve as proof that the user has been authenticated or authorized to perform a transaction.

In some embodiments, in step 204, the validation module 208 may validate Proof 1 118. To do so, the validation module may test Proof 1 118 against the relation 206 using the public input 206, and where the relation 206 validates Proof 1 118, Proof 1 118 is verified. Because Proof 1 118 adheres to the defined relation 206 and is produced by applying the same inputs to the same proof-generation algorithm, the verification confirms the authenticity of the first secret statement 202. Thus, this step establishes a foundation for subsequent proof generation.

In some embodiments, in step 205, following validation of Proof 1 118, the system may create a second secret statement 210 that is derived from the validated Proof 1 118. In some embodiments, the second secret statement 210 represents a higher-level assertion that builds upon the first secret statement 202. The second relation 212 defines the relationship between the second secret statement 210 and the validated Proof 1 118. In some embodiments, rather than a secret statement of confidential data, block 210 may create a statement w formed of public information, such as compressing the Proof 1 118 for use as the secret statement w for generating Proof 2 134.

In some embodiments, in step 206, using the second secret statement 210, the second relation 212, and the validated Proof 1 118, the generate proof 2 module 132 may generate a second cryptographic proof ("Proof 2") 134. Proof 2 134 validates the second secret statement 210 and attests to the correctness of Proof 1 118, thereby implementing a layered proof structure. As a result, layered proofs enhance privacy and security by ensuring that sensitive data is not directly exposed while still allowing for robust validation of the underlying authentication parameters.

In some embodiments, Proof 2 134 may be implemented with a same or different protocol than Proof 1 118. For example, Proof 2 134 may be implemented with a different protocol than Proof 1 118 to achieve greater flexibility, interoperability, and efficiency in the overall cryptographic proof system.

In some embodiments, the inner proof (Proof 1 118) may require a protocol with strong privacy guarantees, such as a zero-knowledge proof, to protect sensitive user or transaction data. The outer proof (Proof 2 134), which attests to the validity of the inner proof, may have different privacy or efficiency requirements, and can use a protocol that aligns better with public verification or integration with distributed ledger infrastructures.

In some embodiments, Proof 2 134 can be intended for submission to external verifiers or distributed ledgers, which may require compatibility with specific proof formats or verification algorithms. Using a different protocol for Proof 2 134 allows the system to meet these interoperability requirements, even if Proof 1 118 uses a protocol that is not natively supported by the external system.

In some embodiments, some proving protocols are more efficient or scalable for certain types of statements or verification environments. By selecting a protocol for Proof 2 134 that is optimized for fast verification or minimal computational overhead, the system can improve performance, particularly when the proof requires validation by numerous parties or on-chain.

In some embodiments, using different protocols allows the system to separate trust boundaries. For example, Proof 1 118 may be generated and validated within a controlled environment, while Proof 2 134 is generated by an external prover and validated by a broader set of verifiers, such as nodes in a blockchain network.

In some embodiments, different applications or regulatory environments may impose requirements on the types of cryptographic proofs that can be used. Implementing Proof 2 134 with a different protocol allows the system to adapt to these requirements without changing the inner proof protocol.

In summary, implementing Proof 2 134 with a different protocol than Proof 1 118 provides the system with the flexibility to balance privacy, efficiency, interoperability, and compliance, while supporting robust and scalable cryptographic proof architectures.

In some embodiments, the layered proof structure depicted in FIG. 2 provides several technical advantages, including hierarchical validation, reduced computational redundancy, and enhanced privacy preservation. Accordingly, by leveraging the results of Proof 1 118 to generate Proof 2 134, the system optimizes computational resources and ensures compatibility with distributed ledger infrastructures.

Figure 3:
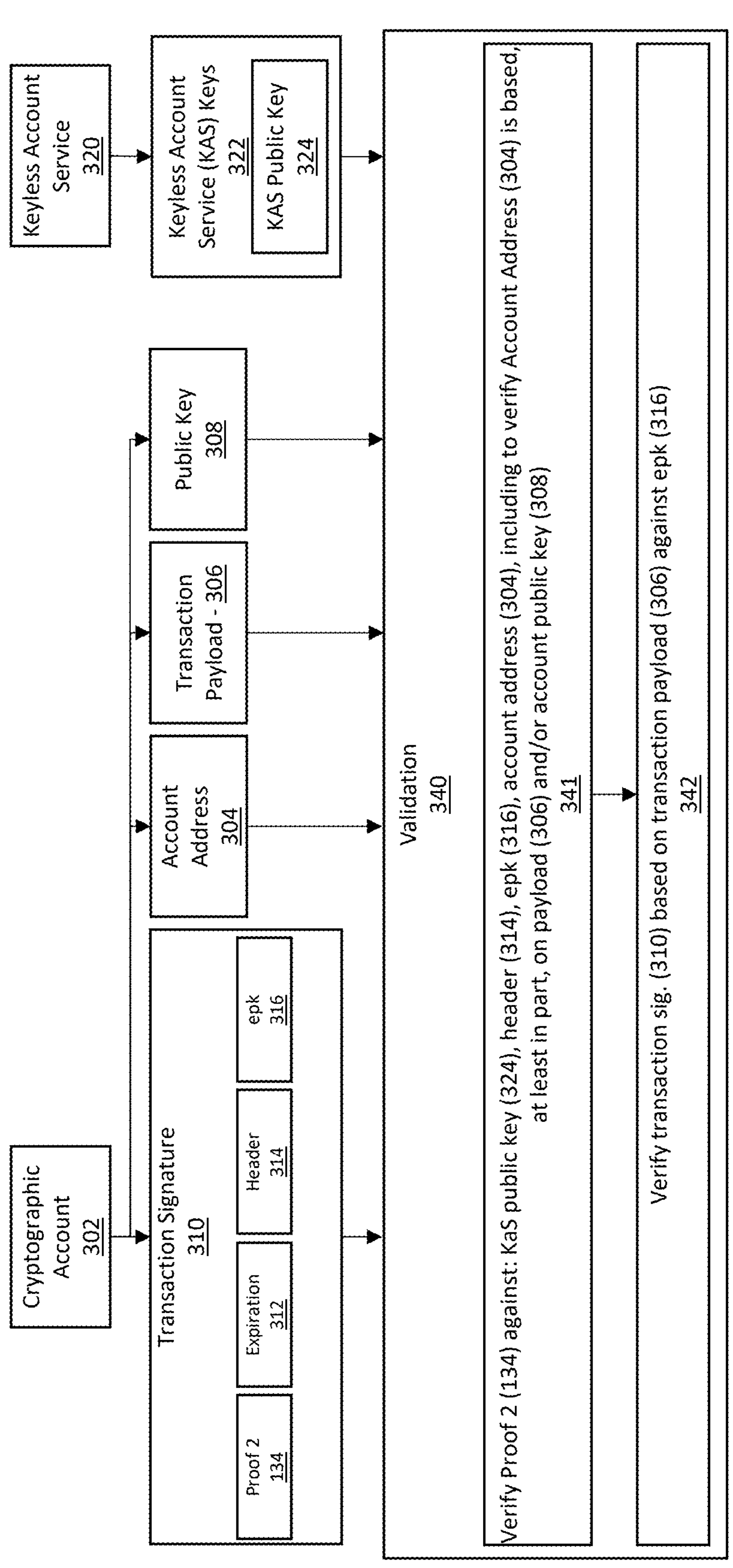
FIG. 3 depicts a block diagram illustrating the validation process for cryptographic accounts and transaction signatures in accordance with one or more embodiments of the present disclosure.

Referring now to FIG. 3, another validation mechanism is depicted for validating a transaction created and signed using the authentication token of the keyless account service in accordance with one or more embodiments of the present disclosure.

In some embodiments, the above transactions include the user identifier and authentication token payload, which reveals user information to the blockchain network. Accordingly, to further improve security and confidentiality, the transaction may be based on zero-knowledge signatures. Thus, instead of the user identifier, authentication token payload and authentication token signature, the transaction may include the authentication token header, the ephemeral public key, the ephemeral public key signature, the expiration period, the expiration maximum, and a zero-knowledge proof, where the zero-knowledge proof proves private information including the application identifier, user identifier, authentication token signature, and authentication token payload.

In some embodiments, validation 322 may use the transaction signature 310, including the authentication token-based transaction signature, the account address 304, the transaction payload 306, the public key 308 and the KAS public key 324 of the KAS keys 322 from the keyless account service 320. Based on this information, validation 322 may validate the transaction signature 310 and the data thereof with zero-knowledge proving. In some embodiments, the transaction data may include the authentication token header 314, an ephemeral public key (epk) 316, an epk signature, the authentication token expiration 312, and a Proof 2 134 to validate the transaction signature 310 against the transaction payload 306.

In some embodiments, the epk 316 may include an epk populating the nonce field of the authentication token 123 and the authentication request 122. Thus, the epk 316 may be used as a limited time or limited use public key for signing the transaction. As such, the transaction signature 310 may include an epk signature that is a signature over the transaction payload 306 under the epk 316. As a result, the epk 316 can be a public key for the transaction signature 310 associated with the authentication token 122 instead of a private key.

In some embodiments, at step 341, validation 340 may validate the Proof 2 134 by deriving a public inputs hash that hashes the derived public inputs of a zero-knowledge algorithm, e.g., utilizing one or more of Succinct Non-Interactive ARguments of Knowledge (SNARK), Scalable Transparent ARgument of Knowledge (STARK), Verifiable Polynomial Delegation (VPD), Succinct Non-interactive ARGuments (SNARG), bulletproofs, among others or any combination thereof. Validating Proof 2 134 may include deriving the public input by accessing data in the transaction payload 306 and/or deriving items based on the data in the transaction payload 306. In some embodiments, a validator may fetch the epk 316, expiration 312, keyless account service identifier, authentication token header 314, and KAS public key 324 of the keyless account service 320, as well as the address 304 and/or public key 308 associated with the cryptographic account 112.

In some embodiments, the zero-knowledge proof may argue the existence of a secret input that satisfies a keyless zero-knowledge relation. In some embodiments, the secret input, wpriv, may include, e.g., the relation of a first proof (e.g., Proof 1 118) R1, the validity of the relation of the first proof, a compression of the first proof, the client ID value, user ID key and/or user ID value, authentication token signature, authentication token payload, among others or any combination thereof. Thus, the zero-knowledge proof may prove the relation R according to equation 1 below:

$$R\begin{pmatrix} pih; \\ w = [w_{pub} = (epk, addr_{idc}, \exp_{date}, \exp_{maximum}, iss, \text{header}, \text{pk}), \\ w_{priv} = (R1, aud, uid, \sigma_{AT}, \text{payload}_{AT})] \end{pmatrix} \quad \text{Eq. 1}$$

where $w_{pub}$ are the public inputs, $w_{priv}$ are the private inputs, R1 is one or more of the relation of a first proof (e.g., Proof 1 118), the validity of the relation of the first proof, and/or the compression of the first proof, epk is the ephemeral public key, $addr_{idc}$ is the identity commitment, $\exp_{date}$ is an expiration period of the epk 316, $\exp_{maximum}$ is the expiration period maximum of the epk 316, iss is the keyless account service identifier, header is the authentication token header 314, pk is the KAS public key 324, aud is the client ID value for the application managing the cryptographic account 112, uid is the user ID value, $\sigma_{AT}$ is the authentication token signature, and $\text{payload}_{AT}$ is the authentication token payload.

In some embodiments, as detailed above, the user may desire or be required to reveal additional information, for example to enable further operations on the blockchain network based on the additional information. Thus, the public information, provided in the transaction data and derived as public inputs to the zero-knowledge proof, may include the additional information.

In some embodiments, at step 324, validation 322 may validate the transaction signature 310 against the epk 316. To do so, the address 304, the transaction payload 306 and the Proof 2 134, may be signed using the epk 316 to create a derived epk signature (Sigepk). The Sigepk may be tested against the transaction signature 310, and where there is a match, the transaction signature 310 is verified.

Figure 4:
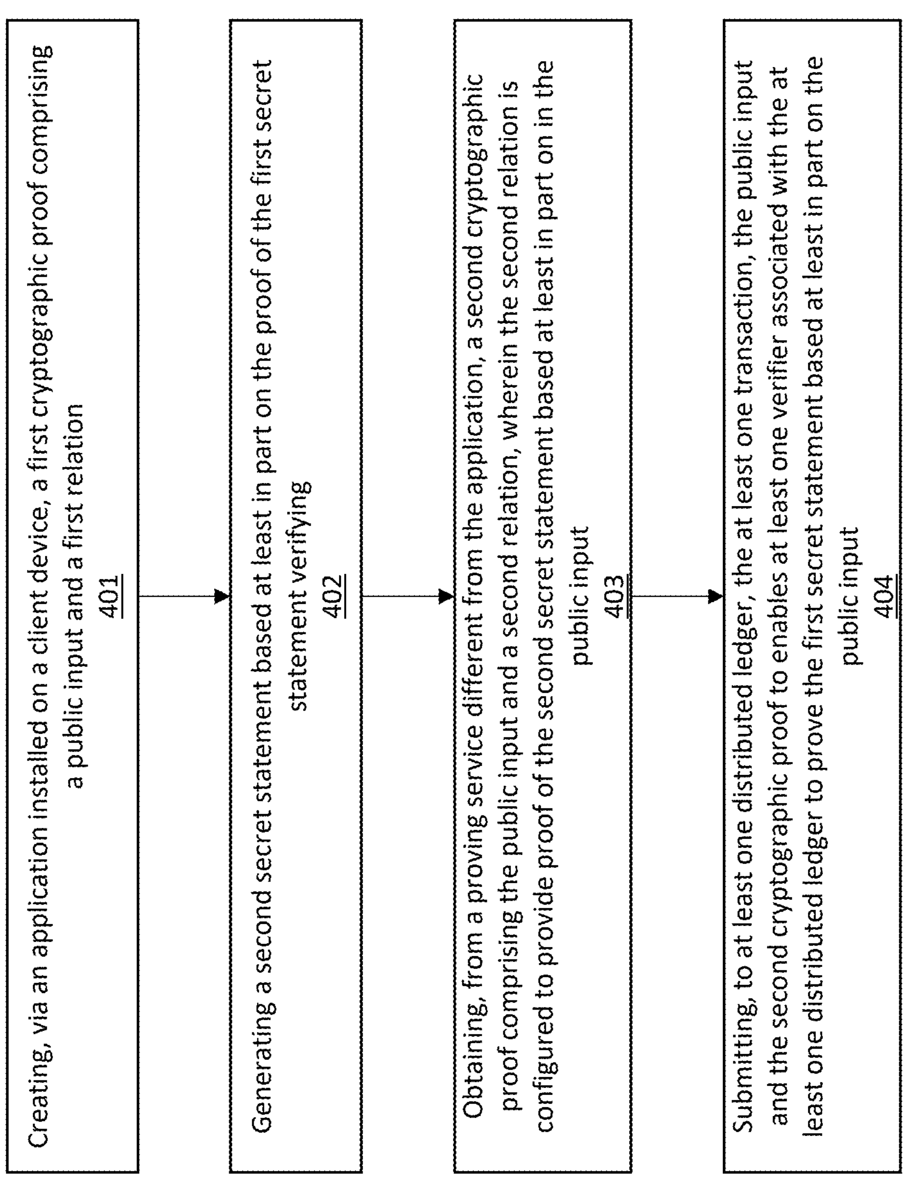
FIG. 4 depicts a flowchart of the cryptographic proof process for generating and submitting wrapped proofs to a distributed ledger in accordance with one or more embodiments of the present disclosure.

FIG. 4 is flowchart 400 for a method of generating and submitting wrapped proofs to a distributed ledger in accordance with one or more embodiments of the present disclosure. In some embodiments, at least one processor of a client device may perform the following steps, where the steps respectively correlate with 401-404 of FIG. 4.

In step 401, the client device may create a first cryptographic proof via an application installed thereon. The first cryptographic proof comprises a public input and a first relation, which is configured to provide evidence of a first secret statement. The first secret statement may include sensitive transaction parameters or user authentication data, and the public input serves as a publicly accessible element that facilitates verification without exposing the underlying sensitive information. Moreover, the first relation defines the mathematical or logical relationship between the first secret statement and the public input, thereby enabling the generation of a secure and compact cryptographic proof.

In some embodiments, at step 402, the client device may generate a second secret statement based at least in part on verification of the first secret statement. The second secret statement represents a higher-level assertion derived from the validated first cryptographic proof. Accordingly, this step establishes a hierarchical validation mechanism, where the second secret statement builds upon the authenticity of the first secret statement, ensuring that sensitive data remains protected while enabling robust validation.

In step 403, the client device may obtain a second cryptographic proof from a proving service that operates independently of the application. The second proof comprises the public input and a second relation, which is configured to provide evidence of the second secret statement. In some embodiments, the proving service may be implemented as a remote server, a cloud-based service, or a dedicated hardware module. As a result, the second proof is generated by validating the first proof and constructing a layered proof structure. This approach reduces the computational burden on the client device, thereby enhancing scalability for systems with high transaction volumes. The second relation ensures that the second proof attests to the validity of the second secret statement without revealing the sensitive data associated with the first proof.

In step 404, the second cryptographic proof, along with the public input and transaction details, may be submitted to at least one distributed ledger. The distributed ledger acts as a trusted repository, enabling verifiers to independently validate the authenticity of the first secret statement based on the public input and the second proof. Thus, the submission ensures that the verification process is immutable and transparent, as the distributed ledger provides an auditable record of the transaction while preserving the confidentiality of the underlying sensitive data. In some embodiments, by leveraging the layered proof structure, the system optimizes computational resources and ensures compatibility with distributed ledger infrastructures, supporting secure and efficient transaction validation.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; ×86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) FreeBSD, NetBSD, OpenBSD; (2) Linux; (3) Microsoft Windows™; (4) Open VMS™; (5) OS X (MacOS™); (6) UNIX™; (7) Android; (8) iOS™; (9) Embedded Linux; (10) Tizen™; (11) WebOS™; (12) Adobe AIR™; (13) Binary Runtime Environment for Wireless (BREW™); (14) Cocoa™ (API); (15) Cocoa™ Touch; (16) Java™ Platforms; (17) JavaFX™; (18)

QNX™; (19) Mono; (20) Google Blink; (21) Apple WebKit; (22) Mozilla Gecko™; (23) Mozilla XUL; (24).NET Framework; (25) Silverlight™; (26) Open Web Platform; (27) Oracle Database; (28) Qt™; (29) SAP NetWeaver™; (30) Smartface™; (31) Vexi™; (32) Kubernetes™ and (33) Windows Runtime (WinRT™) or other suitable computer platforms or any combination thereof. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems or platforms of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, or objects. For example, such projections may be a visual overlay for a mobile augmented reality (MAR) application.

In some embodiments, illustrative computer-based systems or platforms of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

The aforementioned examples are, of course, illustrative and not restrictive.

At least some aspects of the present disclosure will now be described with reference to the following numbered clauses.

Clause 1. A method including: creating, by at least one processor of a client device, via an application installed on the client device, a first cryptographic proof including a public input and a first relation; where the first relation is configured to provide proof of a first secret statement based at least in part on the public input; where the first secret statement includes at least one transaction parameter of at least one transaction; generating, by the at least one processor, a second secret statement based at least in part on the proof of the first secret statement verifying; obtaining, by the at least one processor, from a proving service different from the application, a second cryptographic proof including the public input and a second relation, where the second relation is configured to provide proof of the second secret statement based at least in part on in the public input; and submitting, by the at least one processor, to at least one distributed ledger, the at least one transaction, the public input and the second cryptographic proof; where the second cryptographic proof enables at least one verifier associated with the at least one distributed ledger to prove the first secret statement based at least in part on the public input.

Clause 2. The method of clause 1, further including: receiving, by the at least one processor, from a keyless account service in response to an authentication request, a keyless account service signature including a cryptographic signature, the cryptographic signature being configured to sign over a user identifier, an application identifier of the application, and a nonce; where the application is configured for managing transactions by the user on the distributed ledger; where the nonce is populated with at least one public key associated with the authentication request; and generation, by the at least one processor, the first secret statement based at least in part on the user identifier, the application identifier of the application, or both.

Clause 3. The method of clause 1, where the at least one transaction includes at least one transaction signature including the second cryptographic proof.

Clause 4. The method of clause 1, where at least one of the first cryptographic proof or the second cryptographic proof includes a zero-knowledge proof.

Clause 5. The method of clause 4, where the zero-knowledge proof includes a zkSnark.

Clause 6. The method of clause 1, where the first cryptographic proof and the second cryptographic proof includes a leaky proving protocol that fails to satisfy a formal definition of zero knowledge.

Clause 7. The method of clause 1, further including: obtaining, by the at least one processor, at least one additional cryptographic proof including the public input and at least one additional relation, where the at least one additional relation is configured to provide proof of at least one additional secret statement based at least in part on in the public input; and generating, by the at least one processor, the second secret statement based at least in part on the at least one additional cryptographic proof.

Clause 8. The method of clause 1, where the first cryptographic proof and the second cryptographic proof utilize different proving protocols.

Clause 9. The method of clause 8, where the first cryptographic proof utilizes a first proving protocol including a transparent zero-knowledge proof.

Clause 10. The method of clause 1, where the first secret statement includes at least one first portion of transaction parameters of the at least one transaction, the second secret statement includes at least one second portion of the transaction parameters of the at least one transaction.

Clause 11. A system including: at least one processor of a client device, the at least one processor being in communication with at least one non-transitory computer readable medium having computer instructions stored thereon, where the at least one processor, upon execution of the computer instructions, is configured to: create, via an application installed on the client device, a first cryptographic proof including a public input and a first relation; where the first relation is configured to provide proof of a first secret statement based at least in part on the public input; where the first secret statement includes at least one transaction parameter of at least one transaction; generate a second secret statement based at least in part on the proof of the first secret statement verifying; obtain, from a proving service different from the application, a second cryptographic proof including the public input and a second relation, where the second relation is configured to provide proof of the second secret statement based at least in part on in the public input; and submit, to at least one distributed ledger, the at least one transaction, the public input and the second cryptographic proof; where the second cryptographic proof enables at least one verifier associated with the at least one distributed ledger to prove the first secret statement based at least in part on the public input.

Clause 12. The system of clause 11, where the at least one processor, upon execution of the computer instructions, is further configured to: receive, from a keyless account service in response to an authentication request, a keyless account service signature including a cryptographic signature, the cryptographic signature being configured to sign over a user identifier, an application identifier of the application, and a nonce; where the application is configured for managing transactions by the user on the distributed ledger; where the nonce is populated with at least one public key associated with the authentication request; and generate the first secret statement based at least in part on the user identifier, the application identifier of the application, or both.

Clause 13. The system of clause 11, where the at least one transaction includes at least one transaction signature including the second cryptographic proof.

Clause 14. The system of clause 11, where at least one of the first cryptographic proof or the second cryptographic proof includes a zero-knowledge proof.

Clause 15. The system of clause 14, where the zero-knowledge proof includes a zkSnark.

Clause 16. The system of clause 11, where the first cryptographic proof and the second cryptographic proof includes a leaky proving protocol that fails to satisfy a formal definition of zero knowledge.

Clause 17. The system of clause 11, where the at least one processor, upon execution of the computer instructions, is further configured to: obtain at least one additional cryptographic proof including the public input and at least one additional relation, where the at least one additional relation is configured to provide proof of at least one additional secret statement based at least in part on in the public input; and generate the second secret statement based at least in part on the at least one additional cryptographic proof.

Clause 18. The system of clause 11, where the first cryptographic proof and the second cryptographic proof utilize different proving protocols.

Clause 19. The system of clause 18, where the first cryptographic proof utilizes a first proving protocol including a transparent zero-knowledge proof.

Clause 20. The system of clause 11, where the first secret statement includes at least one first portion of transaction parameters of the at least one transaction, the second secret statement includes at least one second portion of the transaction parameters of the at least one transaction.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:

1. A method comprising:

creating, by at least one processor of a client device, via an application installed on the client device, a first cryptographic proof comprising a public input and a first relation;

wherein the first relation is configured to verify a first secret statement based at least in part on the public input;

wherein the first secret statement comprises identity authentication information associated with at least one transaction to prove authentication of an identity of a user of the application;

determining, by the at least one processor, upon the first cryptographic proof verifying, a second secret statement comprising the first cryptographic proof;

obtaining, by the at least one processor, from a proving service different from the application, a second cryptographic proof comprising the public input and a second relation, wherein the second relation is configured to verify the second secret statement based at least in part on the public input to indirectly prove the authentication of the identity of the user; and submitting, by the at least one processor, to at least one distributed ledger, the at least one transaction, the public input and the second cryptographic proof;

wherein the second cryptographic proof enables at least one verifier associated with the at least one distributed ledger to verify the authentication of the identity of the user by verifying the first cryptographic proof having been verified.

2. The method of claim 1, further comprising:

receiving, by the at least one processor, from a keyless account service in response to an authentication request, a keyless account service signature comprising a cryptographic signature, the cryptographic signature being configured to sign over a user identifier, an application identifier of the application, and a nonce;

wherein the application is configured for managing transactions by the user on the distributed ledger;

wherein the nonce is populated with comprises at least one public key associated with the authentication request; and generation, by the at least one processor, the first secret statement based at least in part on the user identifier, the application identifier of the application, or both.

3. The method of claim 1, wherein the at least one transaction comprises at least one transaction signature computed over the second cryptographic proof.

4. The method of claim 1, wherein at least one of the first cryptographic proof or the second cryptographic proof comprises a zero-knowledge proof.

5. The method of claim 4, wherein the zero-knowledge proof comprises a Zero-Knowledge Succinct Non-Interactive Argument of Knowledge (zkSnark).

6. The method of claim 1, wherein the first cryptographic proof and the second cryptographic proof comprises a leaky proving protocol that fails to satisfy a formal definition of zero knowledge.

7. The method of claim 1, further comprising:

obtaining, by the at least one processor, at least one additional cryptographic proof comprising the public input and at least one additional relation, wherein the at least one additional relation is configured to verify at least one additional secret statement based at least in part on in the public input; and generating, by the at least one processor, the second secret statement based at least in part on the at least one additional cryptographic proof.

8. The method of claim 1, wherein the first cryptographic proof and the second cryptographic proof utilize different proving protocols.

9. The method of claim 8, wherein the first cryptographic proof utilizes a first proving protocol comprising a transparent zero-knowledge proof.

10. The method of claim 1, wherein the first secret statement comprises at least one first portion of transaction parameters of the at least one transaction, the second secret statement comprises at least one second portion of the transaction parameters of the at least one transaction.

11. A system comprising:

at least one processor of a client device, the at least one processor being in communication with at least one non-transitory computer readable medium having computer instructions stored thereon, wherein the at least one processor, upon execution of the computer instructions, is configured to:

create, via an application, a first cryptographic proof comprising a public input and a first relation;

wherein the first relation is configured to verify a first secret statement based at least in part on the public input;

wherein the first secret statement comprises identity authentication information associated with at least one transaction to prove authentication of an identity of a user of the application;

determine, upon the first cryptographic proof verifying, a second secret statement comprising the first cryptographic proof;

obtain, from a proving service different from the application, a second cryptographic proof comprising the public input and a second relation, wherein the second relation is configured to verify the second secret statement based at least in part on the public input to indirectly prove the authentication of the identity of the user; and submit, to at least one distributed ledger, the at least one transaction, the public input and the second cryptographic proof;

wherein the second cryptographic proof enables at least one verifier associated with the at least one distributed ledger to verify the authentication of the identity of the user by verifying the first cryptographic proof having been verified.

12. The system of claim 11, wherein the at least one processor, upon execution of the computer instructions, is further configured to:

receive, from a keyless account service in response to an authentication request, a keyless account service signature comprising a cryptographic signature, the cryptographic signature being configured to sign over a user identifier, an application identifier of the application, and a nonce;

wherein the application is configured for managing transactions by the user on the distributed ledger;

wherein the nonce comprises at least one public key associated with the authentication request; and generate the first secret statement based at least in part on the user identifier, the application identifier of the application, or both.

13. The system of claim 11, wherein the at least one transaction comprises at least one transaction signature computed over the second cryptographic proof.

14. The system of claim 11, wherein at least one of the first cryptographic proof or the second cryptographic proof comprises a zero-knowledge proof.

15. The system of claim 14, wherein the zero-knowledge proof comprises a Zero-Knowledge Succinct Non-Interactive Argument of Knowledge (zkSnark).

16. The system of claim 11, wherein the first cryptographic proof and the second cryptographic proof comprises a leaky proving protocol that fails to satisfy a formal definition of zero knowledge.

17. The system of claim 11, wherein the at least one processor, upon execution of the computer instructions, is further configured to:

obtain at least one additional cryptographic proof comprising the public input and at least one additional relation, wherein the at least one additional relation is configured to verify at least one additional secret statement based at least in part on in the public input; and generate the second secret statement based at least in part on the at least one additional cryptographic proof.

18. The system of claim 11, wherein the first cryptographic proof and the second cryptographic proof utilize different proving protocols.

19. The system of claim 18, wherein the first cryptographic proof utilizes a first proving protocol comprising a transparent zero-knowledge proof.

20. The system of claim 11, wherein the first secret statement comprises at least one first portion of transaction parameters of the at least one transaction, the second secret statement comprises at least one second portion of the transaction parameters of the at least one transaction.

* * * * *